United States Patent [19]

Burns

[11] Patent Number: 4,615,214
[45] Date of Patent: Oct. 7, 1986

[54] PIEZOELECTRIC WIND SENSOR

[76] Inventor: Joseph R. Burns, 33 Merion Pl., Lawrenceville, N.J. 08648

[21] Appl. No.: 730,561

[22] Filed: May 6, 1985

[51] Int. Cl.[4] .............................................. G01W 1/04
[52] U.S. Cl. ................................ 73/189; 73/DIG. 4; 310/338
[58] Field of Search ............ 73/188, 189, 180, 861.74, 73/DIG. 4; 310/800, 338, 366, 369, 371

[56] References Cited

U.S. PATENT DOCUMENTS

| | | | |
|---|---|---|---|
| 2,492,371 | 12/1949 | Sivian | 73/189 X |
| 2,896,449 | 7/1959 | Turner | 73/180 X |
| 3,212,329 | 10/1965 | Bisberg | 73/189 |
| 3,359,794 | 12/1967 | Rosenberg | 73/189 |
| 3,750,127 | 7/1973 | Ayers et al. | 73/DIG. 4 |
| 4,122,712 | 10/1978 | Thomas, Jr. et al. | 73/861.24 X |
| 4,363,991 | 12/1982 | Edelman | 310/338 X |
| 4,539,554 | 9/1985 | Jarvis et al. | 310/338 X |

FOREIGN PATENT DOCUMENTS 0594458  2/1978  U.S.S.R. ............................... 73/189

Primary Examiner—Charles A. Ruehl

[57] ABSTRACT

An anemometer comprises an array (10) of piezoelectric pressure sensors (12), each of the sensors being mounted (e.g., on a circular mast 14) to face into a different wind direction. Electrical means are used to address each of the sensors (via contact wires (26, 28) for determining which of the sensors is generating, within a given time period, the greatest output voltage, thereby indicating the direction of the wind during such time period. In one arrangement, the amplitude of such greatest output voltage is used, via a look-up table, to determine the speed of the wind during such time period. In another arrangement, a separate, additional sensor is used to determine the wind speed.

5 Claims, 3 Drawing Figures

PIEZOELECTRIC WIND SENSOR

BACKGROUND OF THE INVENTION

This invention relates to wind sensors (anemometers) for determining wind direction and speed.

Anemometers of known type generally comprise moving parts which give rise to maintenance and breakage problems. The present invention relates to anemometers containing no (or at least fewer) moving parts, whereby such problems are greatly minimized.

SUMMARY OF THE INVENTION

An anemometer comprises an array of piezoelectric pressure sensors, each of the sensors being mounted to face in a different direction relative to the others of the sensors, thus in different wind directions, and means for electrically addressing each of said sensors for determining which of the sensors is generating, within a given (preferably short) time period, the greatest signal voltage, thereby indicating the direction of the wind during such time period. In one embodiment of the invention, the amplitude of such greatest signal voltage is used, via a look-up table, to determine the speed of the wind during such time period. In another embodiment of the invention, a separate, additional sensor is used to determine the wind speed.

DETAILED DESCRIPTION

Figure 1:
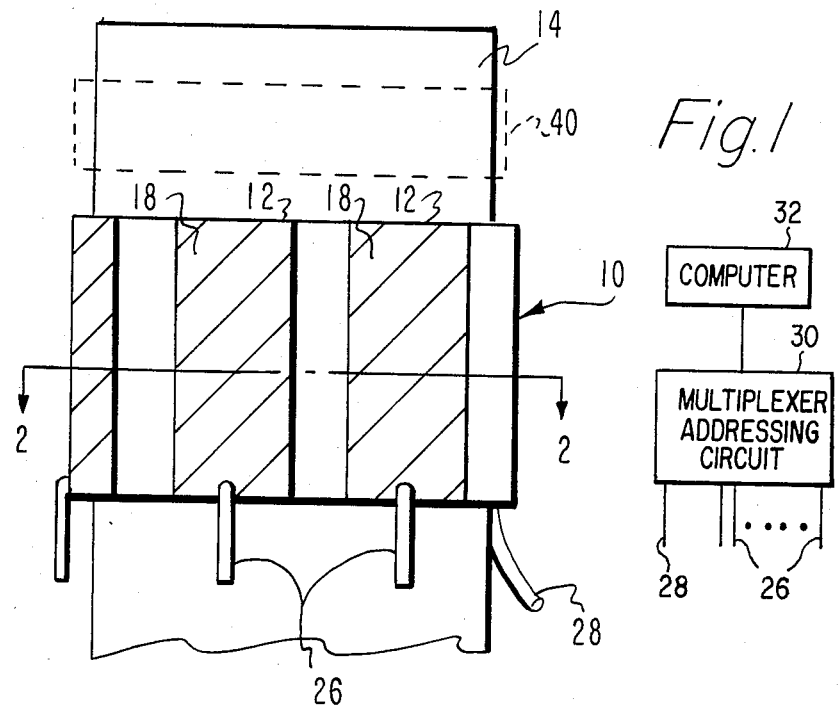
FIG. 1 is a side elevation of a sensor array mounted on a support structure.

With reference to FIG. 1, an array 10 of piezoelectric sensors 12 is shown mounted on a supporting structure, e.g., a solid mast 14. The mast is mounted at a location, e.g., a weather station, where the wind direction and speed are to be determined, the array 10 being directly exposed to the wind. In this embodiment, the mast is of circular cross-section, the elongated axis of the mast is disposed in vertical orientation, and the piezoelectric sensors 12 are disposed in a horizontally oriented, circular array on the outside surface of the mask.

Each piezoelectric sensor 12 can be of known type, e.g., a body of piezoelectric material having overlapping electrodes on opposite surfaces of the body. While practically any known piezoelectric sensor can be used, a preferred sensor comprises a film or layer 16 (FIG. 3) of the known piezoelectric material, polyvinylidene flouride (PVF$_2$), having a thickness around 1 millimeter, having metal, e.g. aluminum, electrodes 18 and 20 on opposite surfaces thereof. In the FIG. 2 arrangement, each individual sensor 12 comprises, as indicated by the dashed lines 22 and 24, an electrode 18, the portion of the electrode 20 overlapped by the electrode 18, and the portion of the PVF$_2$ material disposed therebetween. For ease of manufacture and device assembly, both the electrode 20 and the layer 16 are made continuous, thus providing an array of side by side individual sensors 12. Each sensor 12 can be individually electrically addressed by means of a separate electrical connection 26 (FIG. 1) to each electrode 18, and by means of a single, common electrical connector 28 to the electrode 20.

Thus, to the point described, the anemometer of this embodiment of the invention comprises a single, elongated strip or layer 16 of PVF$_2$ having a continuous electrode 20 on one surface thereof and a segmented electrode 18 on the opposite surface thereof, the oppositely disposed electrodes 18 and 20 being in overlapped relationship. The material PVF$_2$ is a plastic polymer which is relatively inexpensive to manufacture, is flexible and easy to handle, and is chemically and physically stable. The PVF$_2$ strip is wrapped around and secured to the mast 14, as by gluing. The anemometer is completed by the addition of electronic means, indicated by the box 30 in FIG. 1, and described further hereinafter, connected between the common connector 28 and each connector 26, for individually electrically addressing each piezoelectric sensor 12 and analyzing the electrical data received.

The operation of the anemometer is as follows. It is known that for a right circular cylindrical surface (FIG. 3) disposed at right angles to the path of a stream of air, the wind pressure against the cylinder surface is proportional to the square of the wind speed and varies sinusoidally around the cylinder (positive pressure on the windward side and negative pressure-with respect to the ambient air pressure-on the leeward side), with the maximum pressure being at the surface facing directly into the wind, i.e., at right angles thereto. Thus, for the arrangement shown in FIG. 3, with $\theta = 0$ at the x axis, and the wind direction being along the Y axis, $\theta = 90°$, the wind pressure P is a function of V sin$^2\theta$, where V is the wind speed.

Figure 2:
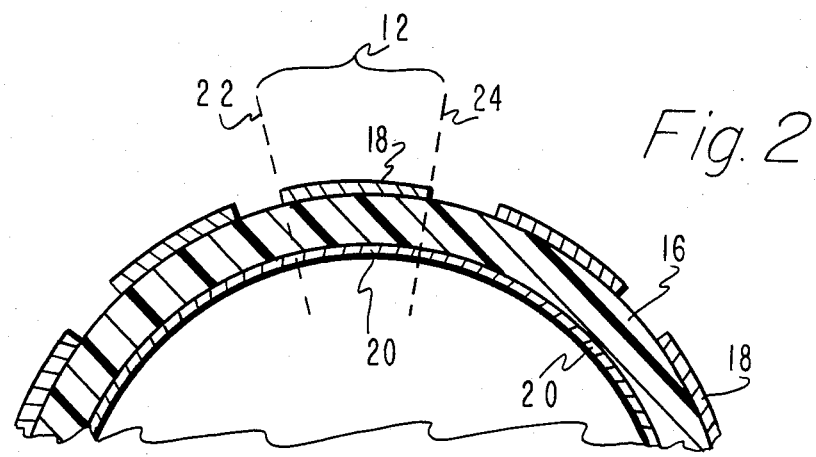
FIG. 2 is a partial cross-section taken along line 2—2 of FIG. 1.
Figure 3:
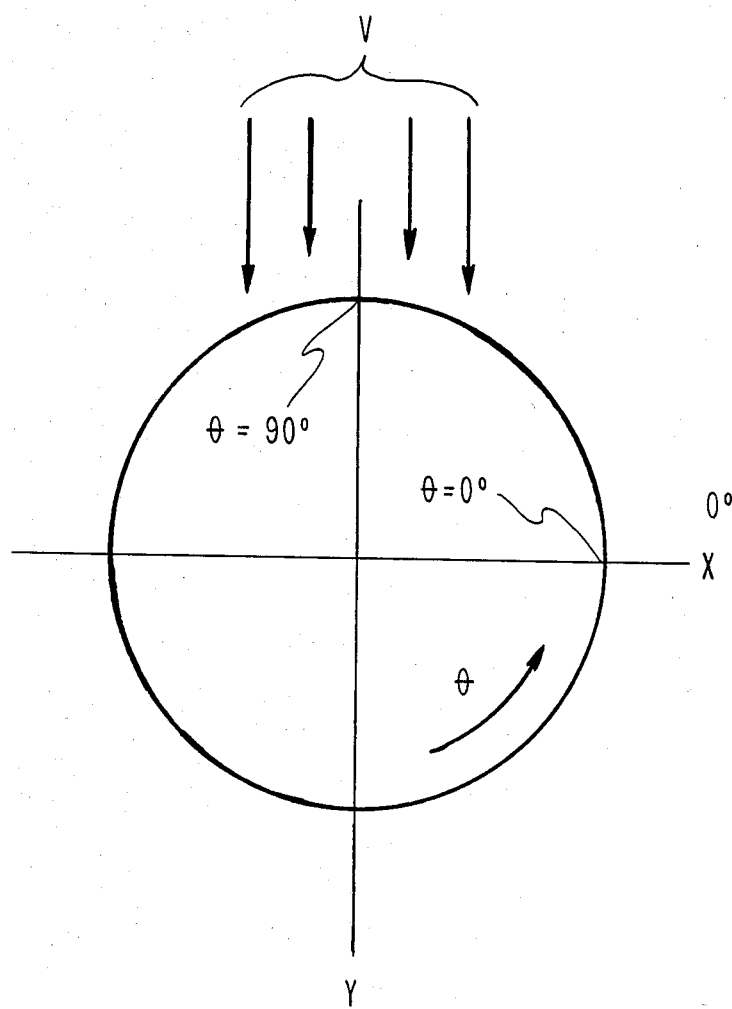
FIG. 3 is a schematic end view of a cylinder disposed in a wind stream.

Accordingly, in the arrangement shown in FIGS. 1 and 2, because the wind pressure is a continuous function of the angle $\theta$, and the piezoelectric sensors are linear mechanical to electrical transducers, the output voltages from the individual sensors 12 represent a pressure (hence velocity) profile around the surface of the cylindrical mast 14. The sensor providing the greatest signal voltage is that sensor facing directly into the wind. Thus, by determining which sensor is, within any given time interval, generating the greatest output signal, the direction of the wind during such time period is immediately found. Also, because the wind pressure is a function of the wind speed, the signal voltage generated by the sensor facing directly into the wind (i.e., the sensor providing the greatest signal voltage) can be directly converted, via a look-up table, into wind speed.

The accuracy of the measurements made is a function of the number and size of sensors used and the time interval over which the measurements are made. With present day electronics, the time intervals can be made, for most purposes, as short as desired. The number and size of the sensors is basically simply a matter of cost.

Known means can be used to make the necessary electrical measurements and determinations. For example, each sensor 12 can be individually and sequentially addressed by a known multiplexer addressing circuit, indicated by the box 30 in FIG. 1, and, during each cycle of operation (i.e., the addressing once of all the sensors of the array), the various sensor output voltages are first stored until all collected, and then compared to determine the sensor generating the largest signal during the current cycle. As already noted, the determination of the sensor generating the greatest signal is a direct indication of the wind direction, and the amplitude of this greatest signal can be converted, via a look-up table (using known computer techniques), into wind velocity.

The look-up table is derived experimentally, and thereafter stored in, for example, the memory of a computer (indicated in FIG. 1 by a box 32 connected to box 30) used with the anemometer.

Piezoelectric sensors are basically a.c. signal devices, and the parameter actually measured by the sensors 12 is the "noise" content of the wind. That is, even with a perfectly constant speed wind, there is a wide range of instantaneous velocities of the individual particles of the wind stream. These velocity variations are detectable as electrical noise (for example, the noise produced by a stream of air directly against a "live" microphone, such as when a microphone is tested by blowing on it) having an rms value related to the wind velocity. To my knowledge, it has not been previously recognized that an a.c. signal device such as the piezoelectric sensors used in the present invention can be used directly as a wind sensor without the use of intervening means for converting the wind energy into vibratory energy.

Other embodiments of the invention are possible. As shown in dashed lines in FIG. 1, it is possible to use the sensor array 10 to determine only the wind direction, and to use a separate detector 40 to measure wind speed. The separate sensor can comprise for example, a continuous strip of PVF$_2$ material having a single, continuous electrode on each opposing surface, this sensor being wrapped around the mast 14 adjacent to the array 10. Advantage of two separate detectors are the simplification of the electronic circuitry and the possibility of obtaining a larger signal for more accurate wind speed measurements.

The anemometer need not be mounted in fixed position, but may be mounted to allow some movement thereof to position it directly into the path of the wind. For example, the mast 14 can be mounted to allow bending thereof to tilt the sensor array parallel to non-horizontal wind streams. Also, arrays having different cross-sections or different outer surface configurations can be used to increase the interaction between the wind and the anemometer for increasing the amplitude of the signal voltages produced thereby. For example, relatively large surface discontinuities can be provided, such as side by side depressions in the surface of the mast (each sensor being disposed within a different depressions) for causing wind turbulence around the various sensors. Such turbulence increases the wind energy transferred to the sensors.

I claim:

1. A wind sensor comprising an array of pressure sensors, each of said sensors comprising a layer of piezoelectric material disposed between a pair of electrodes on opposite surfaces of said layer, support means for facing each of said sensors in a different direction, and means, operable within a preselected time period, for individually electrically addressing each of said sensors for detecting the voltage generated by each of said sensors in response to a wind blowing thereagainst and for comparing the voltages so detected to determine the one of said sensors generating the greatest voltage for determining the prevailing wind direction.

2. A wind sensor according to claim 1 including means for determining the wind velocity along said prevailing direction based upon the amplitude of the voltage generated by said one sensor.

3. A wind sensor according to claim 1 in which said sensor array comprises a single layer of piezoelectric material having a single electrode on one surface thereof and a segmented electrode on the opposite surface thereof, each of said sensors being defined by one segment of said segmented electrode and the portions of said layer and said single electrode overlapped thereby.

4. A wind sensor according to claim 3 in which said support means comprises a mast of circular cross-section, said array encircling said mast in a plane parallel to the mast cross-section.

5. A wind sensor according to claim 4 including an additional sensor axially spaced from said sensor array along said mast and encircling said mast.

* * * * *